United States Patent
Padmavilasom

(10) Patent No.: US 9,069,375 B2
(45) Date of Patent: Jun. 30, 2015

(54) METHOD AND SYSTEM FOR PLATFORM-INDEPENDENT APPLICATION DEVELOPMENT

(71) Applicant: MobileDataForce, Inc., Meridian, ID (US)

(72) Inventor: Priyesh Padmavilasom, Newcastle, WA (US)

(73) Assignee: MOBILEDATAFORCE, INC., Meridian, ID (US)

( * ) Notice: Subject to any disclaimer, the term of this patent is extended or adjusted under 35 U.S.C. 154(b) by 184 days.

(21) Appl. No.: 13/874,305

(22) Filed: Apr. 30, 2013

(65) Prior Publication Data

US 2014/0325470 A1    Oct. 30, 2014

(51) Int. Cl.
*G06F 9/44* (2006.01)
*H04L 29/08* (2006.01)
*G06F 9/455* (2006.01)

(52) U.S. Cl.
CPC .............. *G06F 8/00* (2013.01); *G06F 9/45508* (2013.01); *G06F 8/71* (2013.01); *G06F 8/20* (2013.01); *G06F 9/45512* (2013.01); *H04L 67/2823* (2013.01); *H04L 67/289* (2013.01)

(58) Field of Classification Search
CPC ......... G06F 8/20; G06F 8/71; G06F 9/44505; G06F 9/45508; G06F 9/45512
See application file for complete search history.

(56) References Cited

U.S. PATENT DOCUMENTS

| | | | | |
|---|---|---|---|---|
| 7,448,021 | B1 * | 11/2008 | Lamkin et al. | 717/115 |
| 7,810,076 | B2 * | 10/2010 | Carlos | 717/115 |
| 7,926,030 | B1 * | 4/2011 | Harmon | 717/121 |
| 8,099,472 | B2 * | 1/2012 | Mahaffey et al. | 709/217 |

(Continued)

FOREIGN PATENT DOCUMENTS

EP    2490373    8/2012

OTHER PUBLICATIONS

Min Choi, "A Platform-Independent Smartphone Application Development Framework", Springer Science+Business Media B.V. 2012, Dec. 10, 2012, vol. 114, pp. 787-794; <http://link.springer.com/chapter/10.1007%2F978-94-007-2792-2_78#page-1>.*

(Continued)

*Primary Examiner* — Thuy Dao
*Assistant Examiner* — Ben C Wang
(74) *Attorney, Agent, or Firm* — Parsons Behle & Latimer

(57) ABSTRACT

A non-transitory computer-readable medium having instructions that when executed cause the implementation of a method is disclosed herein. The medium has instructions for facilitating the execution of at least a first hybrid application on a first device, the first hybrid application comprising commands related to platform-specific functionality and platform-independent functionality of the first device. The method includes initializing a loosely-coupled native engine configured to receive commands from the first hybrid application and to facilitate platform-specific functionality on the first device. The loosely-coupled native engine comprises a webserver module. The method includes receiving commands from the first hybrid application, wherein at least one of the commands comprises a device command to be converted to a corresponding platform-specific code prior to execution of the platform-specific code. And the method includes creating a handler to serve the device command and facilitate execution of the corresponding platform-specific code.

8 Claims, 5 Drawing Sheets

(56) References Cited

U.S. PATENT DOCUMENTS

| | | | |
|---|---|---|---|
| 8,261,231 B1* | 9/2012 | Hirsch et al. | 717/121 |
| 8,307,331 B2* | 11/2012 | Warila et al. | 717/115 |
| 8,554,758 B1* | 10/2013 | Larson et al. | 717/103 |
| 8,640,093 B1* | 1/2014 | Gill et al. | 717/120 |
| 8,863,083 B2* | 10/2014 | McKellar et al. | 717/121 |
| 2002/0059402 A1 | 5/2002 | Belanger | |
| 2005/0138082 A1* | 6/2005 | Rauma et al. | 707/200 |
| 2007/0143222 A1* | 6/2007 | Chicks et al. | 705/59 |
| 2010/0153918 A1* | 6/2010 | Mallick et al. | 717/121 |
| 2011/0320475 A1* | 12/2011 | Iwuchukwu | 707/769 |
| 2012/0311724 A1* | 12/2012 | Mahan et al. | 726/29 |
| 2013/0097238 A1 | 4/2013 | Rogers et al. | |
| 2013/0205277 A1* | 8/2013 | Seven et al. | 717/121 |
| 2013/0219415 A1* | 8/2013 | Jeon et al. | 719/328 |
| 2013/0247005 A1* | 9/2013 | Hirsch et al. | 717/121 |
| 2014/0033171 A1* | 1/2014 | Lorenz et al. | 717/121 |
| 2014/0258968 A1* | 9/2014 | Brown et al. | 717/103 |
| 2014/0258969 A1* | 9/2014 | Brown et al. | 717/103 |
| 2014/0258970 A1* | 9/2014 | Brown et al. | 717/103 |
| 2015/0067641 A1* | 3/2015 | Nyisztor et al. | 717/121 |

OTHER PUBLICATIONS

Hui et al., "Cross-Platform Mobile Application for Android and iOS", 2013 IEEE, Apr. 23-25, 2013, pp. 1-4; <http://ieeexplore.ieee.org/stamp/stamp.jsp?tp=&arnumber=6548969>.*

Angulo et al., "A Case Study on Cross-Platform Development Frameworks for Mobile Applications and UX", 2014 ACM, INTERACCION 2014, Sep. 10-12, 2014, pp. 1-8; <http://dl.acm.org/results.cfm?h=1&cfid=646836014&cftoken=84377714>.*

International Search Report & Written Opinion for Application No. PCT/US2014/035942 dated Sep. 30, 2014.

* cited by examiner

METHOD AND SYSTEM FOR PLATFORM-INDEPENDENT APPLICATION DEVELOPMENT

BACKGROUND

The present application relates generally to the field of computer, thin client, and mobile device applications and more specifically to hybrid applications that support functionality that may be accessed via a combination of web programming and platform-specific executable code.

Since 2007, the mobile application industry has grown significantly. For instance, recent research suggests that while in 2007 the market for mobile applications was nonexistent, in 2013 the two primary mobile application stores or marketplaces combined include more than a million applications. And it is expected that by 2016 the mobile application industry will reach almost $50 B in revenue.

Developers seeking entry into the industry usually have the options of either programming independent versions of their products for each platform, programming their products entirely in a web programming language, such as hyopertext markup language 5 (HTML5) and/or JavaScript, or using a hybrid solution that includes aspects of both platform-specific programming and web programming. These hybrid solutions usually rely on access through a mobile device's web browser that may expose the device to security risks, among other things. Additionally, hybrid solutions may restrict or limit access to specialized hardware, such as a global positioning system (GPS), camera, and other peripherals, among other things. Further, hybrid solutions typically require a constant connection to the Internet or may require certain tightly-coupled components or resources that may limit their use on a thin client.

SUMMARY

There is a need for a method and system for hybrid applications that will facilitate the development of platform-independent applications. It would be preferable that implementing a hybrid application would not expose the mobile device to potential security risks. There is a need for a method and system for developing a hybrid application that may be implemented on mobile devices and thin clients.

A method of executing a hybrid application on a device is disclosed herein. The hybrid application includes commands related to both platform-specific functionality and platform-independent functionality of the device. The method includes steps of initializing a loosely-coupled native engine configured to receive commands from the hybrid application. The loosely-coupled native engine is further configured to facilitate implementation of platform-specific functionality on the device. And the loosely-coupled native engine includes a Hypertext Transfer Protocol (HTTP) server and initializing the loosely-coupled native engine comprises initializing the HTTP server. The method includes assigning a unique instance ID to the HTTP server, and configuring the HTTP server to only accept commands comprising the unique instance identifier (ID). The method includes initializing the hybrid application. The method includes receiving commands from the hybrid application. The commands include the unique instance ID of the HTTP server, and at least one of the commands comprises a device command to be converted to a corresponding platform-specific executable code prior to execution of the platform-specific executable code. The method includes verifying that the commands comprise the unique instance ID of the HTTP server. And the method includes creating a handler to serve the device command and facilitate execution of the corresponding platform-specific executable code.

Also disclosed herein is a device compatible with a first platform. The device comprises a memory configured to store local files, a loosely-coupled native engine, and a hybrid application. The loosely-coupled native engine comprises a webserver module, a command dispatch system connected to the webserver module and configured to pass commands to, and receive commands from, the webserver module, and a plurality of handlers configured to handle commands from the command dispatch system and serve a resulting code. The webserver module of the native engine receives a unique instance ID upon initialization of an instance of the webserver module, and the unique instance ID is transmitted to the memory. The webserver module is configured to reject communications that do not include the unique instance ID. The hybrid application is programmed in a platform-independent development environment, wherein the hybrid application comprises commands to be transmitted to the webserver module of the loosely-coupled native engine, and wherein the commands comprise the unique instance ID of the webserver module.

A non-transitory computer-readable medium having instructions that when executed cause the implementation of a method is disclosed herein. The medium has instructions for facilitating the execution of at least a first hybrid application on a first device, the first hybrid application comprising commands related to platform-specific functionality and platform-independent functionality of the first device. The method includes initializing a loosely-coupled native engine configured to receive commands from the first hybrid application and to facilitate platform-specific functionality on the first device. The loosely-coupled native engine comprises a webserver module. The method includes receiving commands from the first hybrid application, wherein at least one of the commands comprises a device command to be converted to a corresponding platform-specific code prior to execution of the platform-specific code. And the method includes creating a handler to serve the device command and facilitate execution of the corresponding platform-specific code.

BRIEF DESCRIPTION OF THE DRAWINGS

Like reference numbers and designations in the various drawings indicate like elements.

DETAILED DESCRIPTION

In the following detailed description, reference is made to the accompanying drawings that form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that various changes may be made without departing from the spirit and scope of the present disclosure. The following detailed description is, therefore, not to be taken in a limiting sense.

Figure 1:
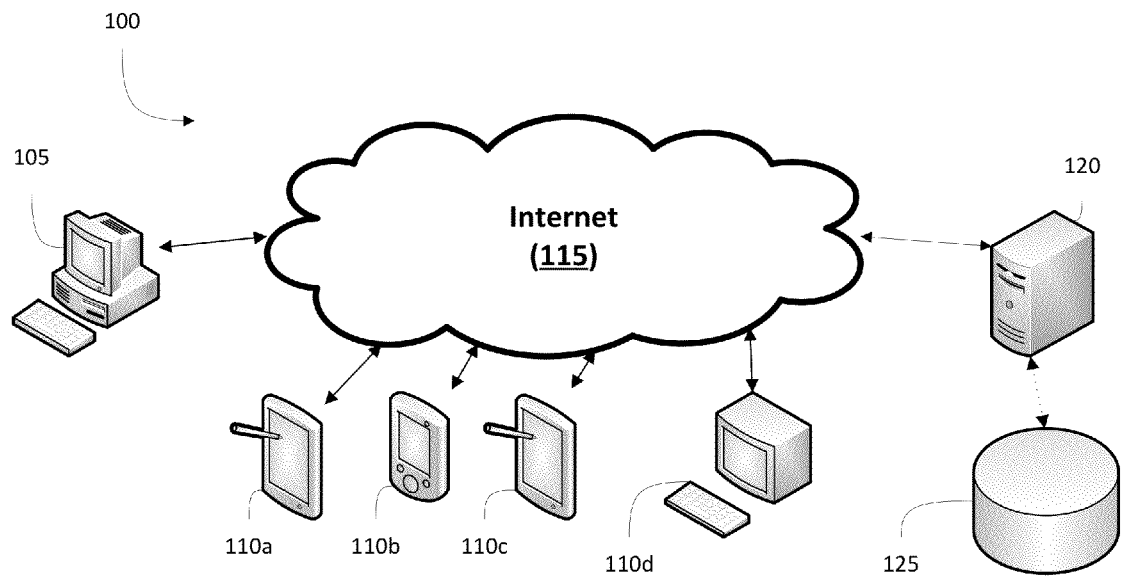
FIG. 1 illustrates an embodiment of a platform-independent application development system.

FIG. 1 shows one embodiment of a system 100 for platform-independent application development comprising client 105, clients 110a-d, remote server 120, and database 125 all connected via Internet 115. As used herein, platform-independent application development refers to the development of applications in one programming language, referred to as a platform-independent development language, or on one platform, that may be implemented on a plurality of platforms without programming, or otherwise developing, a new version of the application for each platform. A platform may be any type of computer or other electronic hardware device having a standard design for use with a compatible operating system. Additionally, as used herein, a platform may be an operating system, such as Windows-based OS, Mac-based OS, UNIX, Linux, iOS, Android, Windows Phone-based OS, Blackberry-based OS, etc. Thus, for example, an application may be programmed in a first language, for instance, a platform-independent development language, and may then be implemented on both iOS and Android platforms without having to program native iOS or Android versions of the application.

As seen in FIG. 1, clients 105 and 110a-110d may all be connected to Internet 115. Client 105 may comprise any suitable client device configured to access or otherwise load a system 100 for platform-independent application development. For instance, client 105 may comprise a Windows-based machine accessing the system 100 for platform-independent application development via a web browser comprising a user interface (UI). Alternatively, client 105 may comprise a system 100 for platform-independent application development loaded in its own internal memory so as to facilitate application development without a connection to Internet 115.

Client 110a represents a tablet or smartphone configured to access Internet 115 via a wired or wireless connection. For instance, client 110a may comprise a tablet with a radio connection to a local router, such as via WiFi, or to a remote cellular tower via long-term evolution (LTE), among other things. Of course, any suitable connection is contemplated by the present disclosure, including different cellular wireless connections, such as global system for mobile (GSM), general packet radio service (GPRS), code division multiple access (CDMA), evolution-date optimized (EV-DO), universal mobile telecommunications system (UMTS), enhanced data rates for GSM evolution (EDGE), worldwide interoperability for microwave access (WiMAX), LTE, and/or any other next generation transmission standard. In another embodiment, client 110a may connect to Internet 115 via a wired connection such as an Ethernet connection to a router, and a cable or DSL connection to an ISP. Clients 110b and 110c also represent mobile devices, such as tablets, smartphones, or any other relevant device, configured to connect to Internet 115 via either a wired or wireless connection.

Client 110d represents a dumb terminal or thin client device (collectively "thin client"). As used herein, a thin client represents any device designed to be lightweight and thus reliant or dependent on another device or computer for a bulk of the processing power necessary to perform its operations. For example, in a warehouse setting, a plurality of hand-held devices may be utilized to scan merchandise and then transmit processing related to the scanned merchandise back to a central computer or computers. The scanned information may be entered into a database for tracking stock of a given product, for instance. In another example, a plurality of thin clients may be set up at a store or movie theater to permit self-checkout, and the plurality of thin clients may be networked with a central server or servers to handle part or a majority of the data processing.

Remote server 120 represents any suitable form of device configured to exchange data with clients 105 and 110a-110d. Remote server 120 may comprise a webserver configured to host data associated with a website or otherwise interact with clients 105 and 110a-110d. For instance, in one example, remote server 120 may comprise an Apache server configured to function using HTTP protocol. Of course, any other suitable form of remote server 120 is contemplated by the present disclosure. Database 125 may comprise any suitable form of database, such as a relational model, an object model, or an object relational model database, among other things. For instance, database 125 may comprise a relational structured query language (SQL) database on remote server 120. In another example, database 125 may be remote to remote server 120. In yet another example, database 125 may comprise a Sybase® database on remote server 120.

A user may access the platform-independent development environment via client 105. The user may be presented with a graphical user interface via which the user may program a hybrid application to work on a plurality of platforms. As used herein, a hybrid application is an application developed in a system 100 for platform-independent application development, and combining elements of both a native application and a Web application. Thus, the hybrid application may comprise commands related to functionality that may be accessed independent of the native functionality of a platform or without use of platform-specific executable code.

For example, the hybrid application may include functionality related to displaying a UI on a mobile device and allowing a user to interact with the UI. The hybrid application may also comprise elements to be accessed through the native functionality of a platform. As used herein, functionality that can only be accessed through the native framework of a platform is referred to as platform-specific functionality. For instance, the hybrid application may include functionality related to a GPS of the mobile device, and in some cases, functionality related to the GPS of a mobile device may be platform-specific functionality. In one embodiment, platform-specific functionality may be achieved using platform-specific executable code, which may correspond to a platform-specific command. Said otherwise, a platform-specific command, or device command, may be drawn to platform-specific functionality of a given platform.

The user may upload the hybrid application to a remote server 120, and the hybrid application may be accessed and/or downloaded to a client device 110a-110d. For instance, client 110a of a first platform, client 110b of a second platform, client 110c of a third platform, and thin client 110d of a fourth platform may all access the same hybrid application, and the hybrid application may be configured to operate on the first through fourth platforms without having to code platform-specific versions of the hybrid application in order to access platform-specific functionality.

Figure 2:
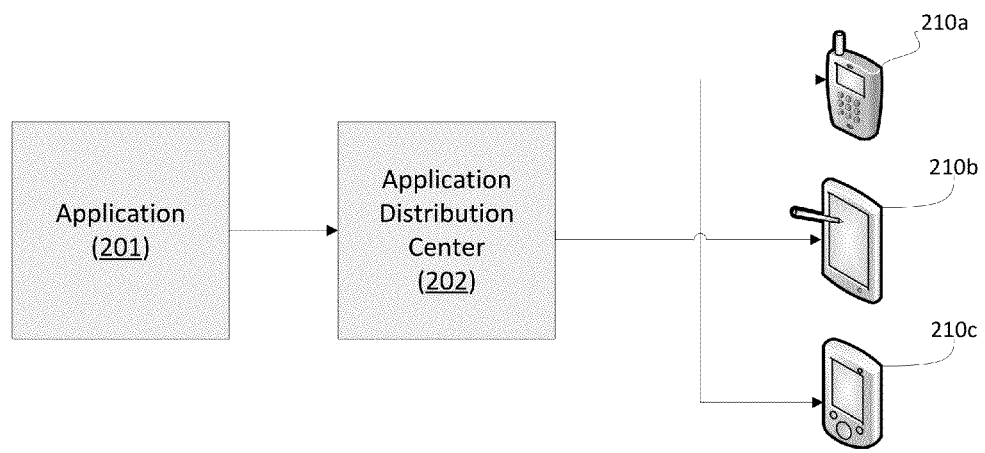
FIG. 2 illustrates an application distribution framework.

FIG. 2 illustrates a method and system by which a hybrid application 201 may be distributed to clients 210a-210c according to one embodiment of the present disclosure. A hybrid application 201 may be pushed to an application distribution center 202 from which the hybrid application 201 may be distributed to clients 210a-210c.

In the context of the system 100 for platform-independent application development, the application distribution center 202 may be housed on remote server 120. After a developer completes development of a hybrid application 201, the developer may then cause the hybrid application 201 to be uploaded to the application distribution center 202. Thereafter, a user of client 210a may elect to download and/or install hybrid application 201. A user interface of client 210a may direct the user to a website to download hybrid application 201, or hybrid application 201 may be automatically pushed to client 210a. In another example, hybrid application 201 may be stored in a database, such as database 125 shown in FIG. 1, and may be accessed and otherwise downloaded by way of a user interface of client 210a. Any other suitable mode or means of application distribution is contemplated by the present disclosure.

Figure 3:
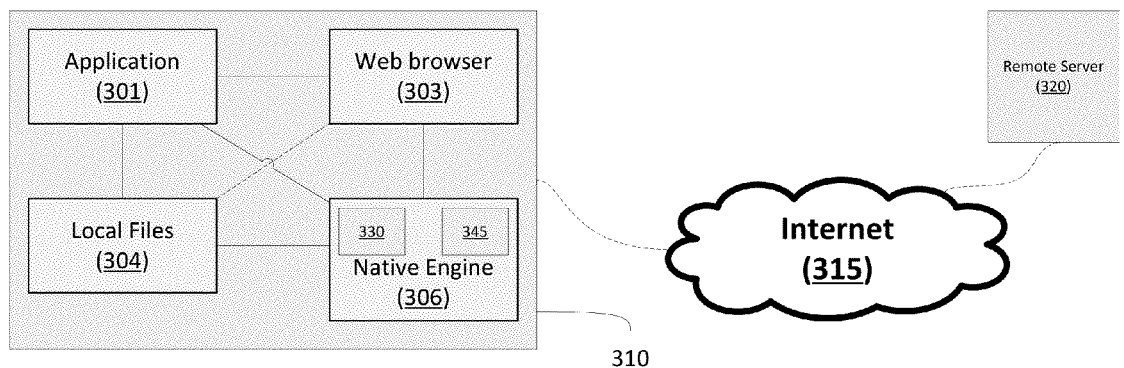
FIG. 3 illustrates a client device according to the present disclosure.

FIG. 3 shows a client 310 in one embodiment comprising a hybrid application 301, a web browser 303, local files 304, and a native engine 306. As shown in FIG. 3, client 310 may be connected to the Internet 315. A remote server 320 may also be connected to the Internet 315. Also as illustrated in FIG. 3, Native engine 306 may comprise a webserver module 330 configured to receive commands related to platform-independent functionality. Native engine 306 may also comprise a handler module 345 configured to receive commands related to platform-specific functionality. Native engine 306 may have logical connections, existing in hardware and/or software, to web browser 303, hybrid application 301, and/or local files 304. Likewise, web browser 303 may have logical connections, existing in hardware and/or software, to hybrid application 301, to native engine 306, and optionally to local files 304. Hybrid application 301 may have logical connections to local files 304, native engine 306, and web browser 303. Finally, local files 304 may have logical connections to hybrid application 301, native engine 306, and optionally to web browser 303.

Hybrid application 301 may comprise any application programmed to take advantage of functionality based on web programming languages, such as hypertext markup language (HTML), HTML5, cascade style sheets (CSS), and JavaScript (or asynchronous javascript and xml (AJAX), which is used interchangeably in the present disclosure), among other things, but nevertheless offers access to platform-specific functionality through a thin native container referred to as native engine 306 in the present disclosure. For instance, hybrid application 301 may be developed primarily using HTML5 and JavaScript, but also relying on native engine 306 to interpret commands from hybrid application 301 into code that may be executed by a given platform. Native engine 306 may comprise any combination of software and hardware configured to receive commands related to platform-specific functionality and/or platform-independent functionality, and assist in facilitating the execution and/or implementation thereof. For instance, native engine 306 may be configured to receive commands from hybrid application 301.

In one example, hybrid application 301 may include commands related to platform-specific functionality such as the camera on an iOS device, among other things. As used herein, a command may comprise a line of code in an application or program directing the implementation or performance of a task or functionality on a client 310. In one embodiment, a command may direct a program, such as a virtual machine or a web browser, among other things, to assist to facilitate the implementation or performance of a task or functionality on a client 310. For instance, hybrid application 310 may comprise commands related to displaying images and content and exchanging information between client 310 and a remote server 120. In this example, web browser 303 and webserver module 330 may work together to facilitate the display of the relevant images and content, among other platform-independent functionality.

As used herein, facilitating the implementation or execution of a command, executable code, or a given functionality refers to the participation of a given component or program in a particular task. For instance, in one example, native engine 306 may participate in the implementation of a command from a hybrid application 301 by receiving the command, and transmitting the command to the appropriate module, such as webserver module 330 or a handler module 345. Native engine 306 may receive executable code from the webserver module 330 and/or the handler module 345 and may transmit or otherwise pass the received executable code to the appropriate module or component of client 310 so that the received executable code may be executed or implemented by client 310. In one example, native engine 306 may receive executable code from webserver module 330, which it may transmit to web browser 303. In another example, native engine 306 may receive executable code from handler module 345, which it may transmit to a relevant module of client 310 for execution. Alternatively, webserver module 330 and/or handler module 345 may be configured to transmit executable code directly to a relevant module of client 310.

Hybrid application 301 may rely on web browser 303 to interpret and execute commands of hybrid application 301 that have been programmed in, for instance, HTML5 and JavaScript. For instance, portions of hybrid application 301 may be programmed in a combination of HTML5 and JavaScript in order to take advantage of graphical display and interaction functionality accessible through, and built into, web browser 303. In one example, hybrid application 301 may comprise commands related to a graphical user interface comprising form elements such as drop down menus, buttons, and text boxes, among other things. In one embodiment, the graphical user interface of hybrid application 301 may not need to access platform-specific functionality in order to be displayed. In another example, hybrid application 301 may comprise commands related to logging into, accessing, writing and reading from a database 125. In this example, hybrid application 301 may not need to access platform-specific functionality in order to process the commands related to database 125, and may perform the commands through web browser 303.

Web browser 303 may comprise a standard web browser of a platform, such as, for example, a WebKit-based browser such as Safari browser on an iOS device, a Chrome browser on an Android device, a Gecko-based browser such as Firefox, or a Presto-based browser such as Opera, among other browsers. Alternatively, web browser 303 may comprise a non-standard web browser, such as a web browser integrated into native engine 306. In one example, web browser 303 may comprise a thin browser integrated into native engine 306.

Local files 304 represent any number and configuration of local files that may be relied upon or accessed by hybrid application 301, web browser 303, and/or native engine 306. Local files 304 may be stored on a memory of client 310, and the memory may be integrated or removable, among other things. In one example, the memory may be a non-transitory computer-readable medium comprising instructions for executing a method.

For instance, local files 304 may store information related to the user and/or the client 310. Local files 304 may store a cache of local data. Local files 304 may be configured to facilitate the functionality of hybrid application 301 and native engine 306. For instance, local files 304 may contain application files that may reside locally in order to accelerate execution of hybrid application 301, native engine 306, and/or web browser 303 code. Local files 304 may also permit client 310 to function and to execute hybrid application 301 without a connection to Internet 315. In one embodiment, local files 304 may comprise local files that may be updated each time a hybrid application 301 or native engine 306 synchronizes with a remote server, such as remote server 120 in FIG. 1. For instance, local files 304 may comprise, among other things, image resources for a hybrid application 301, and the image resources in local files 304 may be updated any number of times, as required, in order to keep hybrid application 301 running the most up-to-date version possible. Of course, as would be readily apparent to one of ordinary skill in the art, the present disclosure contemplates uses of local files 304 beyond the preceding illustrative list.

Figure 4:
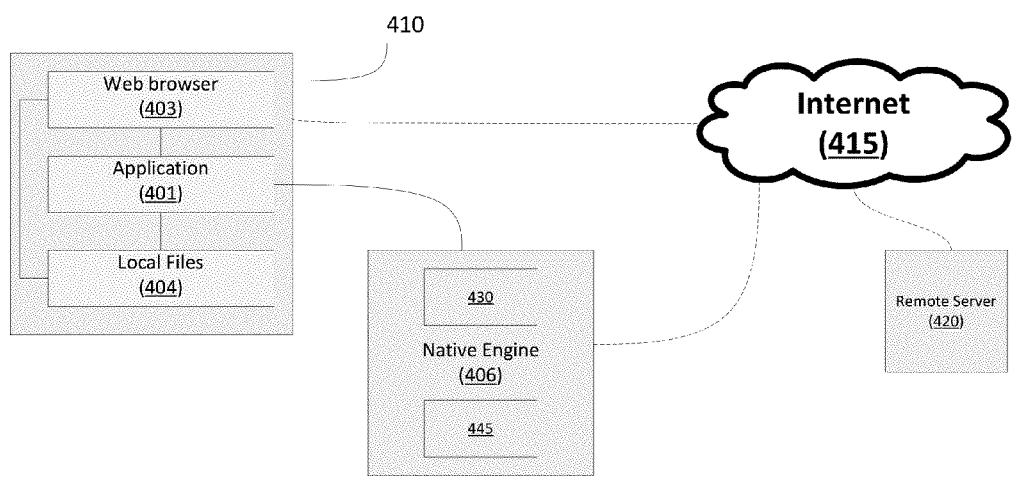
FIG. 4 illustrates another embodiment of a client device.

Native engine 306 represents a container or native engine configured to receive commands from hybrid application 301 and to translate those commands into executable native code, as necessary. Native engine 306 may be further configured to otherwise handle and/or facilitate the execution of commands using web browser 303. For instance, native engine 306 may be configured to facilitate the implementation of application-specific and application-independent functionality via webserver module 330 and handler module 345. As used herein, native engine 306 is a loosely-coupled native engine 306. Generally speaking, loosely-coupled components are components that are not required to have direct knowledge of each other to function, where coupling refers to the degree of direct knowledge that one component may have of the others. Applying this definition to native engine 306, a loosely-coupled native engine 306 is a native engine that functions independently of hybrid application 301 and/or a remote server, such as remote server 120 in FIG. 1. Specifically, loosely-coupled native engine 306 is configured to be run on an entirely different device from hybrid application 301 and client 310, and nevertheless still permit hybrid application 301 to function on client 310, as seen in FIG. 4. In one example, the integration of webserver module 330 into native engine 306 may facilitate and/or otherwise permit the loosely-coupled nature of native engine 306.

Hybrid application 301 of client 310 may comprise commands related to a combination of functionality including platform-specific functionality and platform-independent functionality. In one example, while the platform-specific functionality may need to be executed relying upon code specific to the given platform of client 310, the platform-independent functionality may be executed using a combination of webserver module 330 and web browser 303. As used herein, platform-independent functionality may be any functionality that may be accessed without recourse to platform-specific code or the underlying native framework of a platform. As would be readily apparent to one of ordinary skill in the art, the platform-independent functionality of a first platform may differ from the platform-independent functionality of a second platform. Likewise, platform-specific functionality of a first platform may differ from the platform-specific functionality of a second platform.

In some cases, both platform-specific and platform-independent functionality may pass through native engine 306. Hybrid application 301 may pass commands for platform-specific functionality to native engine 306, and native engine 306 may facilitate the execution of the platform-specific functionality. Hybrid application 301 may also pass commands related to platform-independent functionality to native engine 306, in order to facilitate the execution of platform-independent functionality via webserver module 330. For example, hybrid application 301 may comprise commands, such as user-interface-related commands, that may be executed using webserver module 330, web browser 303, and local files 304. In one embodiment, hybrid application 301 may include a user interface that may be displayed by client 310. Additionally, hybrid application 301 may require access to a peripheral or platform-specific functionality of client 310, such as a GPS unit or a camera, among other things. As hybrid application 301 may need access to such functionality, commands may be passed to native engine 306, the native engine may return executable native code, and the resulting executable native code may then be executed within the platform framework of client 310.

In one example, hybrid application 301 may comprise a music player application and client 310 may comprise a smartphone or other handheld device. As used herein, initializing or initialization refers to starting, running, or creating an instance, or instantiating a program or application, such as hybrid application 301 or native engine 306, among others. When a user initializes hybrid application 301, the user may be presented with a user interface implemented using a combination of webserver module 330, web browser 303, and local files 304. For instance, the user may be presented with a logon screen or a selection of music from which to select a music station. In this example, a portion of the functionality may be achieved using commands programmed in HTML5 and JavaScript, transmitted to webserver module 330, and implemented by web browser 303. However, other functionality, such as functionality related to the operation of LEDs on client 310, access to and use of a GPS device, camera device, and any other platform-specific functionality, may be handled by handler module 345 of native engine 306. For instance, hybrid application 301 may request a geospatial location of client 310 in order to provide relevant advertising. Such functionality may comprise platform-specific code and may thus need to be translated or otherwise converted into executable native code in order to be implemented on client 310. For instance, in one embodiment, native engine 306 and/or handler module 345 may comprise a lookup table configured to facilitate the conversion of a command related to platform-specific functionality into a platform-specific executable code. In another example, information that could assist in the conversion may be stored in a database on client 310, or remotely in a remote server 120. The database may comprise any suitable database, including, but not limited to, a SQL or Sybase® database, among other things.

In another embodiment, hybrid application 301 may comprise a social network photo sharing program. In this example, hybrid application 301 may require access to the camera hardware of client 310. Therefore, whenever hybrid application 301 needs access to platform-specific functionality, such as the camera hardware of client 310, platform-specific code corresponding to the desired functionality may be received from native engine 306 and/or handler module 345 and executed on client 310. Additionally, and particularly if the code is used frequently, it may be stored in local files 304 in order to accelerate implementation of hybrid application 301.

FIG. 4 illustrates another embodiment of a platform-independent application environment. Client 410 comprises a hybrid application 401, an optional web browser 403, and local files 404. Additionally, native engine 406 may run remotely from client 410 and may comprise a webserver module 430 and a handler module 445. For instance, client 410 may comprise a thin client, and native engine 406 may run on another machine or server. Internet 415 may optionally be connected to either client 410 or native engine 406, or both client 410 and native engine 406. A remote server 420 may also be connected to the Internet 415

In operation, much as described above in relation to FIG. 3, hybrid application 401 may comprise a combination of platform-specific and platform-independent functionality. The platform-independent functionality of hybrid application 401 may be executed on client 410 relying on a code from webserver module 430 implemented by web browser 403 and local files 404. For instance, hybrid application 401 may include commands related to a user interface. Client 410 may display the user interface-related functionality of hybrid application 401 using commands from hybrid application 401 as handled by webserver module 430 and implemented by web browser 403. In order for client 410 to execute the platform-specific functionality of hybrid application 401, native engine 406, taking advantage of its loose coupling with client 410, may be configured to receive commands related to the platform-specific functionality of client 410, handle the commands at the handler module 445, and transmit code corresponding to the platform-specific functionality to be executed by client 410.

In one example, client 410 may comprise a handheld scanning device used in a warehouse environment, and native engine 406 may be installed and running on a server or other computer. In this example, client 410 may be connected to a network in the warehouse environment by which it may access native engine 406. Thus, native engine 406 may be located locally within the warehouse environment or outside of the warehouse environment, such as on an intranet or on a larger IP network, among other things. Hybrid application 401 may comprise an application configured to facilitate the tracking of product or other aspects of the warehouse environment. Thus, according to the present disclosure, updates may be automatically pushed to hybrid application 401 without specifically updating each client 410. Additionally, client 410 may be replaced with a new client 410 of an entirely different platform, but hybrid application 401, native engine 406, webserver module 430, and handler module 445 may still support the new platform. As implemented in the warehouse environment, client 410 may comprise an IR scanning module configured to scan barcodes. In this example, client 410 may display a user interface using platform-independent functionality. For instance, web browser 403 may be configured to display code related to the user interface as received from webserver module 430. However, the user interface of hybrid application 401 may include a button that the user may activate when needing to scan a barcode using the IR scanning module of client 410, which may comprise platform-specific functionality in this example. In such cases, native engine 406 and handler module 445 may provide native code corresponding to the desired platform-specific functionality.

In another example, client 410 may comprise thin client terminals located, for instance, on a university campus connected to a university network. In this example, client 410 may comprise a web browser 403, a hybrid application 410, and local files 404. Client 410 may comprise a light-weight and inexpensive device supporting any number of platforms. Such light-weight devices may offer a number of advantages over traditional full-powered client devices. Native engine 406 may be located on a server or other machine on the university network. In one example, hybrid application 401 may comprise an application to give university students access to their university email, class schedule, and other student-specific resources. Hybrid application 401 may include HTML5 and JavaScript programming to present students with access to the university services. For example, hybrid application 401 may first present the user with a logon screen prompting entry of user credentials. Client 410 may communicate with native engine 406 and/or webserver module 430 in order to facilitate the implementation of commands related to the logon screen. Hybrid application 401 may also include platform-specific functionality, such a biometric or image-based identification at logon. As described above, commands related to platform-specific functionality may be transmitted to native engine 406 and/or handler module 445, and code corresponding to the given platform-specific functionality may be received in return to be executed on client 410.

Of course, the preceding examples are provided for illustrative purposes and are not intended to be an exhaustive list of functionality. Indeed, a wide range of possible uses and implementations are contemplated by the present disclosure.

Figure 5:
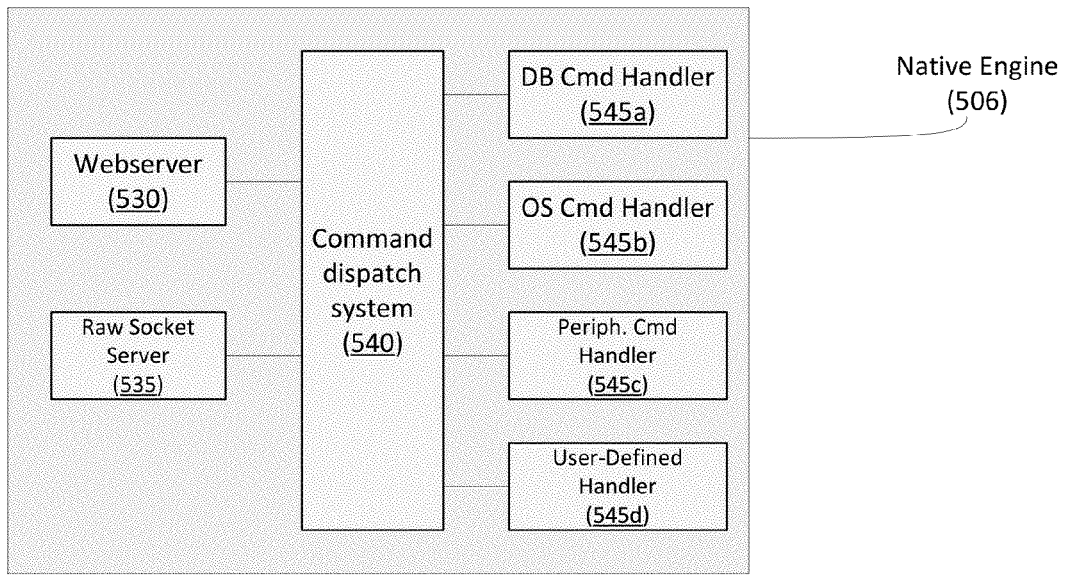
FIG. 5 illustrates a native engine in a platform-independent application development system.

FIG. 5 illustrates one embodiment of native engine 506. In this implementation, native engine 506 comprises a command dispatch system 540 configured to facilitate the transfer of communication data between, to, and from a webserver module 530, a raw socket server 535 and/or a plurality of handlers 545a-d. The handlers 545a-d shown in FIG. 5 include a database command handler 545a configured to handle and/or serve commands related to a database, an OS command handler 545b configured to handle and/or serve commands related to functionality of a given operating system, a peripheral command handler 545c configured to handle and/or serve commands related to the peripherals of a client device (for instance, GPS, IR reader, camera, etc.), and a user-defined handler 545d configured to handle and/or serve commands related to any user-defined functionality.

As used in the present disclosure, platform-specific functionality may comprise functionality related to any combination, or in the totality, of handlers 545a-545d, depending on the platform. For instance, a first platform may require access to platform-specific code in order to access database functionality via database command handler 545a, while a second platform may not. In one embodiment, the database with which database command handler 545a interacts may reside on a client, such as client 310 illustrated in FIG. 3. For example, data may be transmitted to the database and stored therein in order to facilitate the operation of an offline mode of a client, such as client 310, where contact with the remote server, such as remote server 120 in FIG. 1, may not be required. In another example, the database may reside external to client 310.

Command dispatch system 540 may comprise any combination of hardware and/or software required to facilitate the communication of data within, or external to, native engine 506. For instance, in one example, command dispatch system 540 may operate in the software stack of client 310. Likewise, webserver module 530 may comprise any suitable type of webserver configured to function within the system 100 for platform-independent application development of the present disclosure. As used herein, a webserver, such as webserver module 530, may be any combination of hardware and software configured to listen on a network port, and implement the HTTP server protocol. For example, webserver module 530 may comprise a standard HTTP server configured to handle communications and commands as would any traditional HTTP server. Alternatively, webserver module 530 may comprise a specialized and/or proprietary module configured to handle commands from a hybrid application, such as hybrid application 301 illustrated in FIG. 3, and/or command dispatch system 540. In one embodiment, webserver module 530 may be stored on a system external to native engine 506. Raw socket server 535 may comprise any suitable module for providing interprocess communication and/or listening in on raw sockets. For example, raw socket server 535 may comprise a Berkeley socket server configured to provide Internet and Unix domain sockets.

In operation, raw socket server 535 may listen in on raw sockets and receive a communication from a hybrid application, such as hybrid application 301 illustrated in FIG. 3. The communication may be passed to command dispatch system 540 in order to determine how the communication should be routed. For instance, if the communication includes a command for platform-specific functionality, command dispatch system 540 may route the command to the appropriate handler 545a-545d. If the communication includes a command related to platform-independent functionality, command dispatch system 540 may route it to webserver module 530 for handling.

In one embodiment, a hybrid application, such as hybrid application 301 illustrated in FIG. 3, may comprise a music application, as described above, comprising application-specific functionality and application-independent functionality. Commands from the hybrid application directed to, for example, user interface layout may be directed, via command dispatch system 540 to webserver module 530, and then back to the client for implementation. On the other hand, commands from the hybrid application directed to platform-specific functionality, such as a GPS unit, may be received at command dispatch system 540 and directed to the appropriate handler 545a-545d. In the case of a command related to the GPS unit, the command may be directed to peripheral command handler 545c, and an executable code returned to the client.

In another embodiment, a hybrid application, such as hybrid application 401 illustrated in FIG. 4, may comprise an application on a thin client, such as client 410 illustrated in FIG. 4, of a university network. In this example, commands from the hybrid application directed to platform-independent functionality, for example, user interface layout and function, may be directed, via command dispatch system 540 to webserver module 530, and then back to the client for display. On the other hand, commands from the hybrid application directed to platform-specific functionality, such as a camera module, may be received at command dispatch system 540 and directed to the appropriate handler 545a-545d. In the case of a command related to the camera module of the client, the command may be directed to peripheral command handler 545c. In the case of, for example, access to a given bus of the client, the command may be directed to OS command handler 545b. Of course, these are but two illustrative examples of how native engine 506 may receive, transmit, handle, and serve commands from a hybrid application, such as hybrid application 301 illustrated in FIG. 3 or hybrid application 401 illustrated in FIG. 4.

Figure 6:
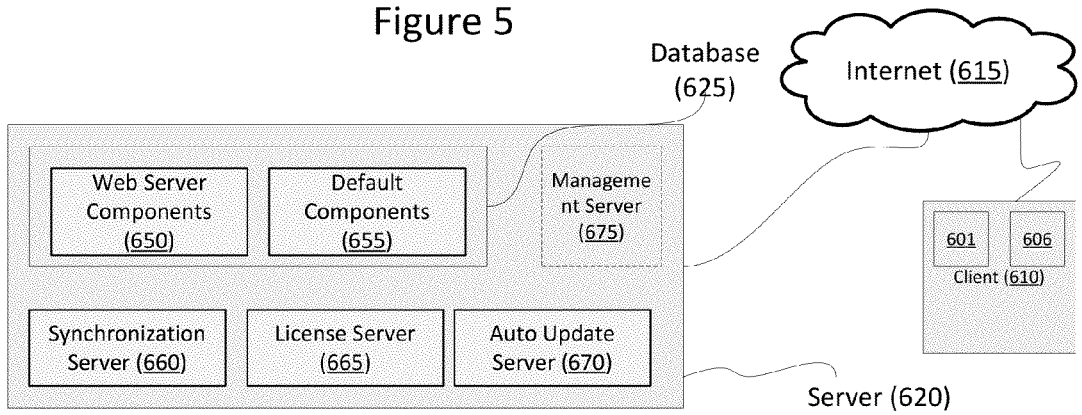
FIG. 6 illustrates a remote server according to the present disclosure.

FIG. 6 illustrates an embodiment of a remote server 620. Remote server 620 may be connected to a client 610 via the Internet 615. As shown in FIG. 6, remote server 620 may comprise a database module 625 comprising webserver components 650 and default components 655. The remote server 620 further comprises a synchronization server 660, a license server 665, and an auto update server 670. The components of remote server 620 may be located on the same server or device, or on different servers or devices, or any suitable combination thereof. Optionally, remote server 620 may also comprise a management server 675, as indicated by the broken lines in FIG. 6. In this example, management server 675 may be configured to facilitate communication with a client 610 and proper function of the system for platform-independent application development, such as the system 100 illustrated in FIG. 1. Management server 675 may reside in a memory on remote server 620. In this example, the memory may comprise a non-transitory computer-readable medium comprising instructions for executing a method. Alternatively, management server 675 may reside on a system or server separate from remote server 620. Management server 675 may work in conjunction with a device management module (not shown) in order to facilitate communication between remote server 620 and a client 610. Remote server 620 and its subparts may comprise any combination of hardware and/or software.

In one embodiment, synchronization server 660 may be available for access from a client 610. In one example, a server comprising a database, such as database 125 illustrated in FIG. 1, may be located external to synchronization server 660, and may be located behind a firewall. Meanwhile, management server 675 may reside on the same device or server as synchronization server 660, or on a different device or server. In any case, synchronization server 660 may be configured to control LAN access, synchronization server 660, and/or a database. Additionally, remote server 620 may comprise a system controller (not shown) configured to start, stop, add, and remove servers. In one example, the system controller may be configured to be accessible only from a console of remote server 620.

Default components 655 represent any components that may be installed on remote server 620 by default. For instance, default components 655 may include a database server, a synchronization server, a management console/server, a system services controller, and extended enterprise connections (not shown), among other things. In one example, default components 655 may comprise a different combination of components and modules than in another embodiment, based, in part, on the unique needs and interests of a given user. In another example, different default components 655 may be offered based on a subscription or license level of a user. Indeed, a flexible system is contemplated whereby a user may be provided basic core components in a module of default components 655, and additional components may be added as necessary. For instance, in one embodiment, default components 655 may comprise a combination of components necessary for managing an application independent development environment, components necessary to connect to an enterprise database (ODBC connections), third party systems (e.g., third party accounting, CRM, and ERP systems, among other things), and components necessary to connect to client devices and facilitate the implementation of hybrid applications using a combination of web programming languages, such as HTML5 and JavaScript, and native languages, among other things.

In some embodiments, synchronization server 660 and auto update server 670 may be combined into one module. Alternatively, synchronization server 660 and auto update server 670 may be independent. Synchronization server 660 and auto update server 670 may be included in default components 655, or may be installed separately. Synchronization server 660 may be configured to facilitate the synchronization of a client 610, with remote server 620. Auto update server 670 may be configured to facilitate pushing updates of a native engine 606, and/or updates of a hybrid application 601, to a client 610. License server 665 may be configured to verify the license of a given user. In one embodiment, license server 665 may verify whether the developer of a hybrid application 601 has a valid license, and therefore, whether hybrid application 601 may access remote server 620 and/or native engine 606. In another embodiment, license server 665 may verify whether the user of a hybrid application 601 has a valid license, and therefore, whether the hybrid application 601 may access remote server 620 and/or native engine 606.

In operation, a hybrid application 601 and/or a native engine 606 may periodically connect to remote server 620. For instance, in one example, native engine 606 may attempt to connect to remote server 620 every time native engine 606 is initialized. Information from database 625 may be transmitted to client 610. For example, synchronization server 660 and/or auto update server 670 may communicate with native engine 606 of a client 610 to verify that all components of native engine 606 and/or hybrid application 601 are synchronized and otherwise up-to-date. This verification may comprise sending and/or receiving synchronization data that may comprise data regarding the current status of a hybrid application 601 and/or a native engine 606. The synchronization data may also comprise data regarding new and unsynchronized data for the hybrid application 601 and/or the native engine 606. For instance, if the platform of client 610 were to install an update requiring an update of native engine 606, upon connection of native engine 606 with remote server 620, files may be accessed and transferred from webserver components 650 and/or default components 655 in order to update native engine 606 to take advantage of any changes and/or new functionality of the platform of client 610. Also, if a developer were to issue an update of hybrid application 601, upon connection to remote server 620, the new version of hybrid application 601 could be pushed to client 610.

Figure 7:
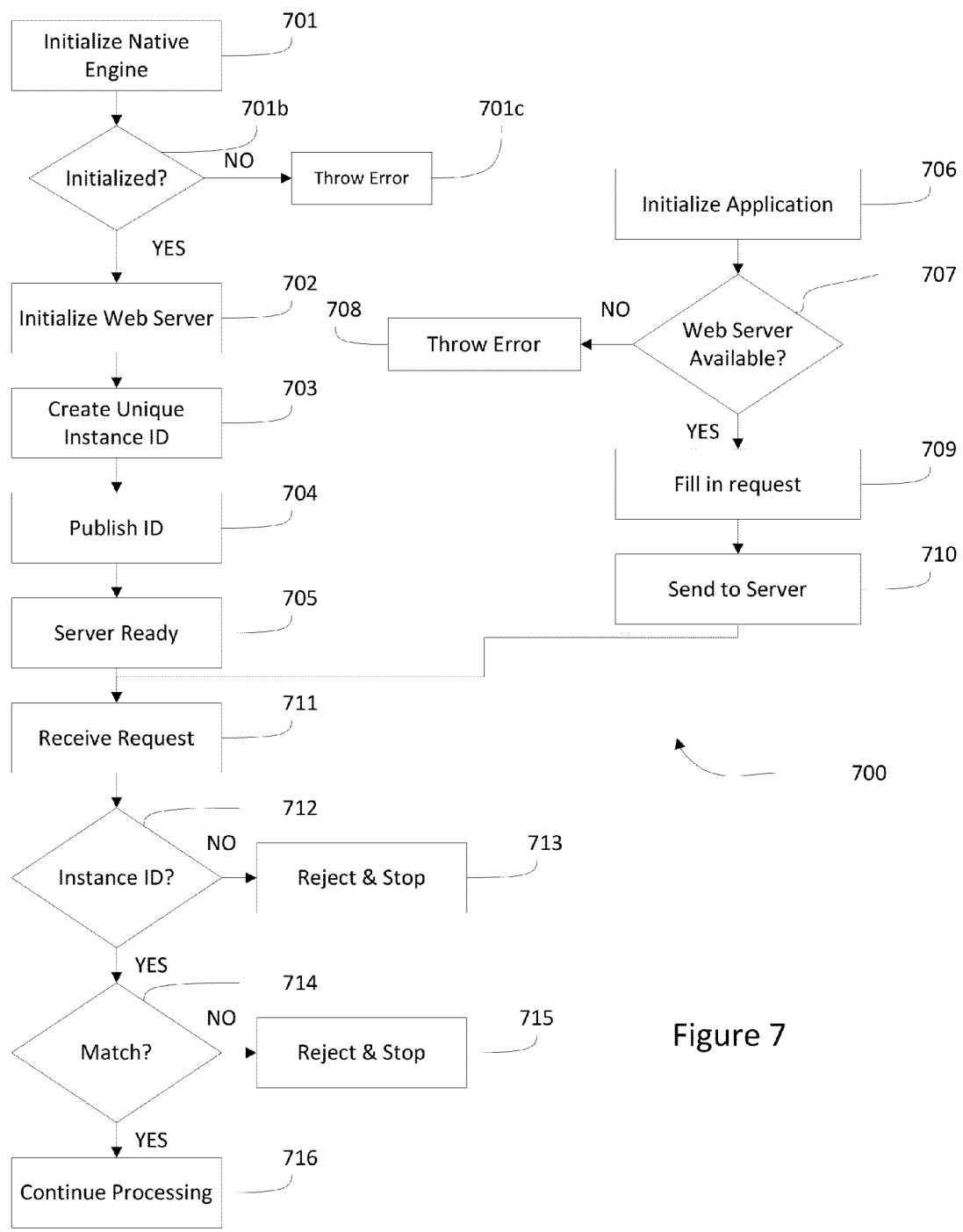
FIG. 7 illustrates a method of processing an application according to the present disclosure.

FIG. 7 illustrates a method 700 comprising a plurality of steps for the operation of a hybrid application 301 and a native engine 306. In a first method step 701, native engine 306 is initialized. In one embodiment, this initialization of native engine 306 may occur automatically when a client 310 starts up. In another example, initialization of native engine 306 may occur automatically when a hybrid application 301 is initialized. In yet another example, native engine 306 may initialize upon receiving a request or interaction from a user, for example, if a user clicks or selects an icon, among other things.

In a second step 702, a webserver module 330 is initialized after native engine 306 is initialized or concurrently therewith. In some cases, a software or hardware error may not allow webserver module 330 to initialize and a method step 701b comprising testing whether the webserver module 330 successfully initialized may throw an error and notify the user and/or the developer of the native engine 306 of the error in a method step 701c. As webserver module 330 initializes, a unique instance ID is created and assigned to the webserver module 330 in a third method step 703. The unique instance ID may comprise any suitable identification configured to identify a given instance of webserver module 330. The unique instance ID may be used when transmitting commands to webserver module 330 and may assist in the avoidance of unauthorized communications and functionality. In a next method step 704, the unique instance ID of native engine 306 is published. In one example, the unique instance ID may be communicated locally to all hybrid applications 301 installed on a client 310. In another example, the unique instance ID may be communicated to a remote server, such as remote server 420 illustrated in FIG. 4, or other device to facilitate the communication with a native engine, such as native engine 406 illustrated in FIG. 4, residing remotely from a hybrid application 401. Alternatively, the unique instance ID may be communicated only to clients 410 on a local network shared by a client 410 and a native engine 406. Of course, any other suitable arrangements are also contemplated by the present disclosure.

In a next method step 705, the webserver module 330 is ready to receive and transmit communications. In one embodiment, webserver module 330 indicates this readiness by sending a communication to native engine 306. In another embodiment, webserver module communicates directly with any and all hybrid applications 301 installed on a client 310. In another example, webserver module 330 does not actively indicate readiness, and only responds to queries when ready.

A hybrid application 301 may be initialized in parallel with, or independently of, native engine 306 in a method step 706. In one embodiment, a hybrid application 301 may be displayed like any native application, such as, for example, as an icon on a client 310. In another embodiment, hybrid application 301 may be accessed through menu available through native engine 306 or an application associated with native engine 306. In a next method step 707, hybrid application 301 checks to verify that a webserver module 330 is available on native engine 306. If not available, an error may be thrown in another method step 708. Assuming that the webserver module 330 is available, a command from hybrid application 301 is appended with the unique instance ID of webserver module 330 in a next method step 709. The command with appended unique instance ID is then transmitted to native engine 306 and/or webserver module 330 in a next method step 710.

In a next step 711, the command with appended unique instance ID is received. In a method step 712, the command may be tested to determine whether a unique instance ID has been appended. If there is no unique instance ID, then the command is rejected in method step 713. Thus, in one embodiment native engine 306 and webserver module 330 may be configured to reject unauthorized communications and access. In an associated step 714, the appended unique instance ID may be checked against the unique instance ID published in step 704. If there is no match, then the communication is rejected and the process is stopped in a method step 715. However, if the unique instance IDs match, then the processing of the command may be continued in a next step 716.

However, in a thin client embodiment, native engine 406 and webserver module 430 may be configured to receive communications and/or commands external sources like client 410. For instance, method step 704 comprising publishing the unique instance ID of webserver module 430 may comprise transmitting unique instance ID to client 410, or to a remote server 420. In this example, client 410 may transmit and receive communications from native engine 406.

It is to be understood that the preceding method 700 is presented to illustrate operation of a hybrid application 301 and native engine 306, or hybrid application 401 and native engine 406, in one embodiment of the present disclosure. One of ordinary skill in the art would appreciate that the principles discussed in this disclosure support additional methods and processes.

Figure 8:
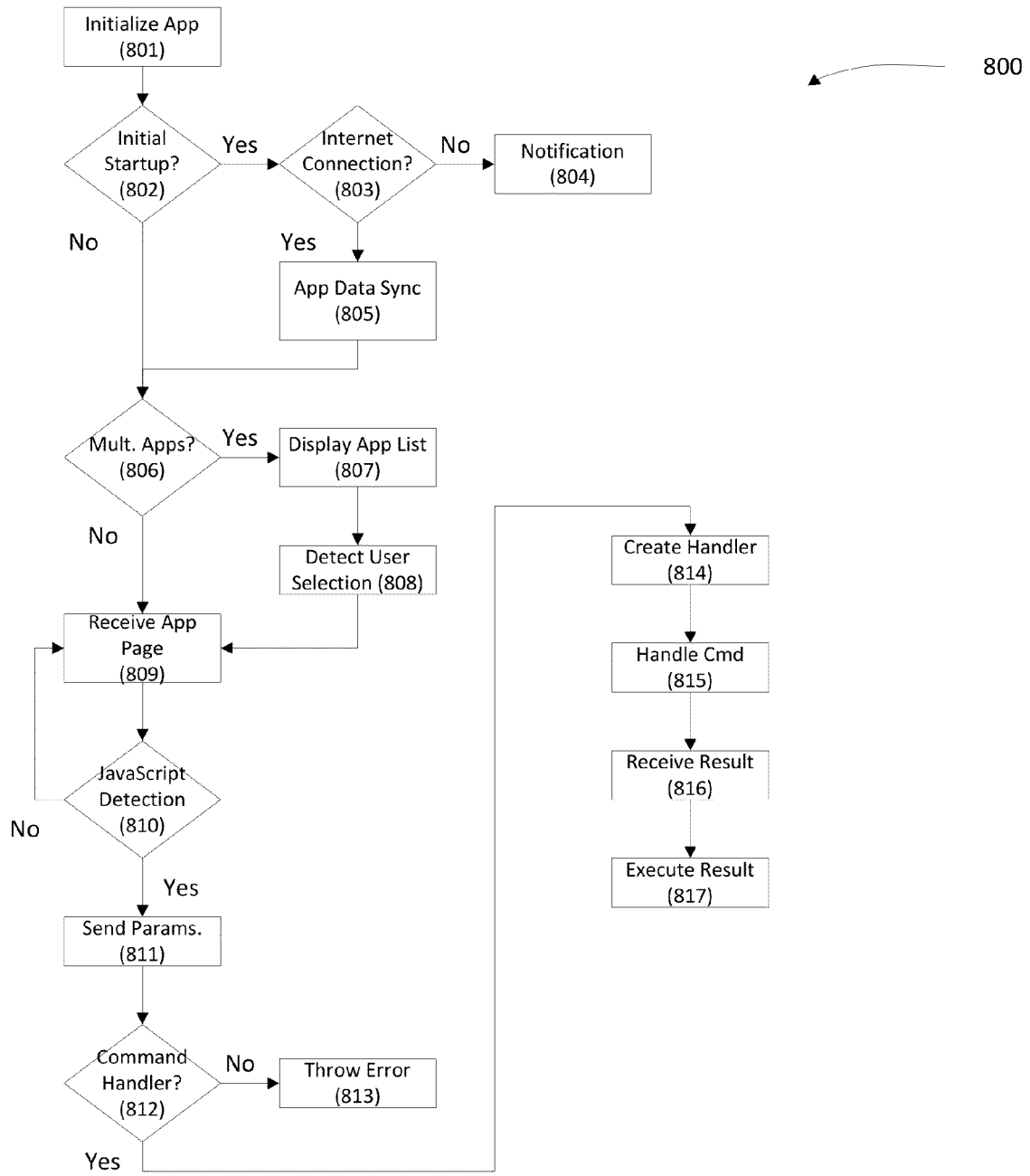
FIG. 8 illustrates another embodiment for processing an application.

FIG. 8 illustrates a method 800 of operating a native engine 306 that is consistent with the present disclosure. In an initial step 801, a native engine, such as native engine 306 illustrated in FIG. 3, is initialized is initialized on a client. Native engine 306 may automatically initialize upon startup of a client, such as client 310 illustrated in FIG. 3, or it may initialize as the result of a user selection or interaction, such as a click. In a next step 802, a detection routine may run to determine whether the application has ever initialized previously, or if the present initialization represents the first time that the application has initialized.

If it is determined that this initialization represents the first initialization of the native engine 306, then a subroutine may run to test the presence of a connection to the Internet and to sync application data in steps 803 and 805. In Internet detection step 803, the native engine 306 may attempt to connect to remote server 320, in order perform any initial setup that may be required. For instance, it may be required to sync application data to client 310. It may also be necessary to verify a license prior to providing access to content, among other things. If the native engine 306 is unable to establish a connection to remote server 320, or otherwise unable to detect a connection to the Internet, then in a step 804 the native engine 306 may provide a notification to the user via, for example, a prompt on the screen of client 310. In one example, the notification may indicate the lack of Internet connectivity and inform the user that he or she will need to connect to the Internet to continue using the native engine 306 and/or any associated applications. In a different embodiment, the notification may inform the user of the lack of connectivity, but nevertheless provide limited access to its functionality. The step 805 of syncing application data may comprise providing remote server 320 with information about the particular installation of an application and/or native engine 306, and may receive information from remote server. For instance, remote server 320 may transmit updated files to native engine 306.

In a next method step 806, the native engine 306 will detect whether multiple hybrid applications 301 are installed or otherwise associated with client 310. If more than one hybrid application 301 is installed, then the native engine 306 will run a subroutine comprising displaying an application list in a method step 807, and detecting a user selection in a method step 808. In a next method step 809, a page associated with a hybrid application 301 will be received by client 310 and/or native engine 306. For example, hybrid application 301 may have an initial screen that may be displayed using a web programming language such as HTML5 and/or JavaScript. In this example, hybrid application 301 may transmit commands related to its initial screen to native engine 306 for implementation in this step. The commands received from hybrid application 301 may comprise a combination of HTML5 and JavaScript commands, and native engine 306 may implement and/or display the HTML5 commands normally while detecting and sending the JavaScript commands through a webserver module 330 for processing and implementation in a step 810. This processing may comprise sending parameters to webserver module 330 in a method step 811. In one example, the commands received from hybrid application 301 may comprise commands requesting access to a database programmed in JavaScript, and the command parameters may be sent on to webserver module 330 for processing.

Associated with step 811, the webserver 330 can parse the command to find the relevant request command. In a next step 812, it is determined whether a command handler is available for the request. If no appropriate handler is found, then an error is thrown in a step 813, and the process terminates. Otherwise, in a step 814, the appropriate handler is created and the parameters are passed to the handler. For example, the command may require an OS command handler 545b, a peripheral command handler 545c, or a user-defined command handler 545d, among other things. For instance, the command may be related to the operation of a GPS of a client 310, and the relevant peripheral command handler, such as peripheral command handler 545c, may receive the command and parse out the appropriate command language, among other things.

In method step 815, the handler will handle the command. In some cases, this may represent a result being returned. In other cases, it will result in executable code, among other things, being returned, which may trigger a success event in response to the JavaScript call. In one example, database command handler 545a may return data from a database, or may return a success result. In another example, OS command handler 545b may return executable code related to a platform-specific functionality, such as, for example, an LED on a client 310. In yet another example, peripheral command handler 545c may return a result related to a peripheral function. For instance, peripheral command handler 545c may return a result, such as executable code or other data, related to a peripheral of client 310. The returned result may comprise, for example, a geospatial position of client 310, or it may comprise executable code from an IR reader or a Bluetooth module, among other things. Additionally, user-defined handler 545d may return a result related to a user-defined function. For instance, a developer may develop a handler for performing a predetermined function, and may set up a specific handler to perform the predetermined function.

In a next method step 817, a browser or the platform may execute the result returned. For example, if the command sent was related to verifying a username and a password, the result could relate to the success of the username/password combination, or that there was an error or mismatch. In another example, if the command was related to accessing a platform-specific functionality, the result could be executable code related to the platform-specific functionality.

In one example of method step 817, the result is executed or processed. For instance, if the relevant handler 545a-545d returns executable code, then the code will be executed on client 310. In one example, database command handler 545a may return code related to content on in a database 125. For instance, database command handler 545a may return information related to the user of client 310, such as a name and/or profile information, among other things, to provide a dynamic experience. In another example, code may be returned related to a platform-specific functionality.

The present disclosure illustrates the advantages of a system having a loosely-coupled native engine comprise a webserver module. A loosely-coupled native engine may be configured to facilitate the implementation of hybrid applications on a wide range of clients, including mobile devices and thin clients, among other things. A loosely-coupled native engine comprising a webserver module may be configured to facilitate the interpretation of commands related to both platform-specific functionality and platform-independent functionality without transmitting the commands a remote server.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A method of executing a hybrid application on a device, the hybrid application comprising commands related to platform-specific functionality and platform-independent functionality of the device, the method comprising:
 initializing a loosely-coupled native engine configured to receive commands from the hybrid application, and further configured to facilitate implementation of platform-specific functionality on the device, and wherein the loosely-coupled native engine comprises a hypertext transfer protocol (HTTP) server and initializing the loosely-coupled native engine comprises initializing the HTTP server;

assigning a unique instance identifier (ID) to the HTTP server, and configuring the HTTP server to only accept commands comprising the unique instance ID;

initializing the hybrid application;

receiving commands from the hybrid application, wherein the commands comprise the unique instance ID of the HTTP server, and further wherein at least one of the commands comprises a device command to be converted to a corresponding platform-specific executable code prior to execution of the platform-specific executable code;

verifying that the commands comprise the unique instance ID of the HTTP server; and creating a handler to serve the device command and facilitate execution of the corresponding platform-specific executable code.

2. The method of claim 1 further comprising executing the corresponding platform-specific executable code on the device.

3. The method of claim 1 further comprising:

receiving an unauthorized command that does not comprise the unique instance ID of the HTTP server; and rejecting the unauthorized command.

4. The method of claim 1 further comprising:

determining whether the initialization of the loosely-coupled native engine is a first ever initialization of the loosely-coupled native engine on the device; and synchronizing application data upon a determination that the initialization of the loosely-coupled native engine is the first ever initialization, wherein application data comprises data related to at least one of the loosely-coupled native engine and the hybrid application.

5. The method of claim 1 further comprising:

determining whether additional hybrid applications are installed or otherwise associated with the device; and displaying a list of the additional hybrid applications available on the device.

6. The method of claim 1 further comprising:

parsing the received commands;

detecting whether the received commands comprise JavaScript commands; and sending detected JavaScript commands to the webserver module.

7. The method of claim 1 further comprising:

transmitting a communication to a synchronization server residing on a remote server; and receiving synchronization data in response to the transmission.

8. The method of claim 1 further comprising:

verifying a license associated with the loosely-coupled native engine; and granting access to the loosely-coupled native engine upon a determination that the license is valid.

\* \* \* \* \*